Feb. 11, 1958  R. E. KEITH  2,822,637
FISHING LURE
Filed Feb. 25, 1957
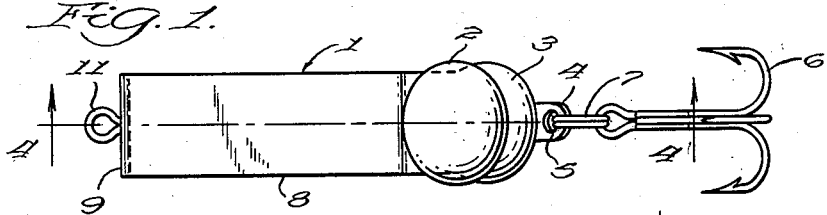
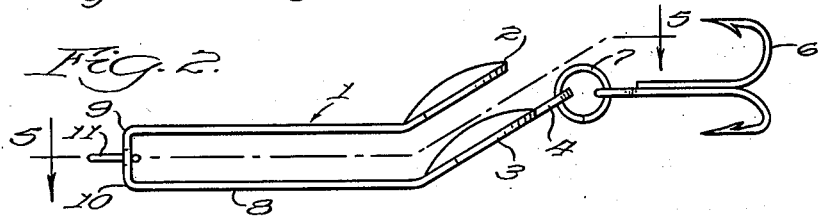
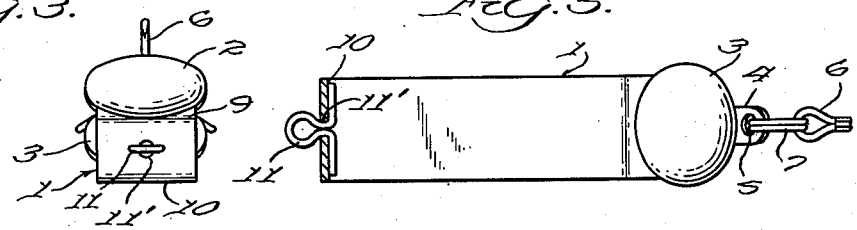
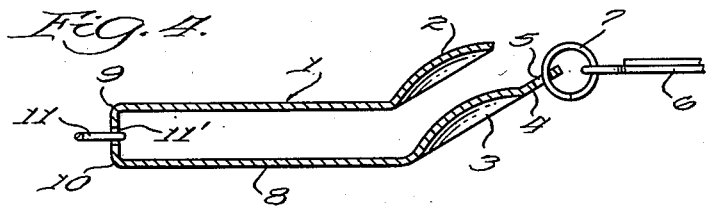
INVENTOR.
Raymond E. Keith.
BY
Harold J. LeVesconte
Atty.

United States Patent Office 2,822,637
Patented Feb. 11, 1958

2,822,637

FISHING LURE

Raymond E. Keith, San Fernando, Calif.

Application February 25, 1957, Serial No. 641,888

4 Claims. (Cl. 43—42.5)

This invention relates to fishing lures and more particularly to an improved form thereof especially adapted to partake of a rolling motion in alternate directions when drawn through the water.

The principal object of the invention is to provide a fishing lure which is formed from a single piece of metal and which when drawn through the water partakes alternately of a rolling motion of several revolutions in one direction and then in a reverse direction to an equal extent whereby the twisting of the fishing line is avoided even in the absence of a swivel interposed between the fishing line and the lure.

Another object of the invention is to provide a fishing lure comprising a strip of resilient metal bent on itself substantially midway of the length thereof, having means at the bend thereof for attachment of a fishing line and having a hook attached to the longer of the two ends of the lure and at a point which is laterally offset from the axial line of the lure.

A further object of the invention is to provide a fishing lure formed of a strip of resilient material bent on itself slightly offset from the midlength thereof and having the longer of the two resulting ends thereof provided with a hook and with both of said ends terminating in a spoon like configuration inclined to the axial line of the lure and disposed in spaced parallel relation to each other.

Still another object of the invention is to provide a fishing lure in which all of the foregoing objectives are realized in practice, which is simple in construction and susceptible of economical manufacture and which is effective for its intended purpose.

With the foregoing objects in view, the invention resides in the parts, and in the construction, combination of parts disclosed, by way of examples, in the following specification particularly describing certain presently preferred modes of execution of the invention; reference being had to the accompanying drawings which form a part of said specification and in which drawings:

Fig. 1 is a side elevational view of a lure embodying one form of the invention, Fig. 2 is an edge elevational view of the lure shown in Fig. 1, Fig. 3 is a front end view with the lure in the attitude shown in Fig. 2, Fig. 4 is a longitudinal, medial sectional view taken on the line 4—4 of Fig. 1, Fig. 5 is a sectional view taken on the line 5—5 of Fig. 2.

Referring first to Figs. 1 through 5, the body 1 of the lure comprises a strip of resilient sheet metal having rounded ends 2 and 3 of slightly larger diameter than the width of the strip; the end 3 terminating in a hook attaching tab 4 disposed in diametral alignment with the body of the strip and having a perforation 5 therein for attachment of a fishhook 6 by suitable means such as the split ring 7. The strip body 8 at a point slightly offset from the midlength thereof is bent back on itself by two right angle bends 9 and 10 from which the trailing ends of the strip extend in parallel spaced relation; being spaced apart a distance which is slightly less than the width of the strip. The rounded ends 2 and 3 are given a concavo-convex configuration and are bent at an acute angle to the planes of the straight portions of the trailing ends extending from the bends 9 and 10 with the concave surfaces of said rounded ends facing said planes. The point of forming the bends 9 and 10 is so located that the end carrying the rounded end 3 is the longer of the two ends and the tab 4 extends therefrom at the said angle whereby (see Fig. 2) the axial line of the hook is offset from the longitudinal medial line of the lure body beyond the portion terminating in the end 2 a distance which is substantially twice the distance from the said portion to the axial line of the lure. At the front end, the lure body is provided with an eye member 11 for attachment to a fishing line; said eye being disposed in the longitudinal medial line of the lure and comprising a wire loop having the ends thereof inserted through a hole 11' in the front end of the lure and the said ends being bent parallel to the inner face of the body member and soldered or otherwise secured thereto.

When dragged through the water, the lure will assume a slow rolling motion for a few turns in one direction and then for a few turns in the opposite direction and the slower it is thus dragged the fewer turns it will make in each direction before reversing. It will not roll in either direction sufficiently to twist the line to an extent that will cause the line to snarl. The lure is extremely reliable in hooking fish striking on it. This is believed to stem from the fact that the free ends are easily sprung together and therefore as readily pulled out of the mouth of the fish as in the case of the lure shown in my prior Patent No. 2,756,633 dated July 31, 1956, but with this difference; the inclined ends 2 and 3 give a rocking motion to the lure as it is pulled out of the fish's mouth with resultant partially lateral movement of the hook within the fish's mouth and consequent greater assurance that the hook will be set.

While in the foregoing specification there has been disclosed certain presently preferred embodiments of the invention, it is not to be deemed that the invention is limited to the exact embodiments thus disclosed, and it will be understood that the invention embraces all such changes and modifications in the parts and in the construction, combination and arrangement of parts as shall come within the purview of the appended claims.

I claim:

1. A fishing lure comprising a body member formed of a strip of sheel metal having a bend disposed transversely and substantially at the mid length thereof to form a front end portion and spaced, parallel trailing end portions; said trailing end portions at the distal ends thereof being rounded and of greater width than the portions thereof disposed between said front end portion and said distal end portions and said distal end portions having a concavo-convex configuration and being disposed at substantially equal acute angles to the planes of the respective side surfaces of the said portions of said trailing end portions disposed between said front end and said distal ends, a fishhook attached to one of said distal end portions, and an eye carried by said front end portion affording means for attachment of a fishing line to said lure.

2. A fishing lure as claimed in claim 1 in which the concave sides of said distal end portions are at the sides thereof facing said front end portion.

3. A fishing lure as claimed in claim 1 in which said eye is disposed in a plane parallel to and midway between the planes of the surfaces of the portions of said trailing end portions and in which said fishhook is attached to the one of said distal end portions which extends rearwardly toward the plane of said eye.

4. A fishing lure as claimed in claim 1 in which the concave sides of said distal end portions are disposed at the sides thereof facing said front end, in which said eye is disposed in the medial longitudinal line of said lure and in which said fishhook is attached to the one of said distal end portions extending rearwardly and toward said medial longitudinal line.

References Cited in the file of this patent
UNITED STATES PATENTS

| | | |
|---|---|---|
| 2,719,378 | Salm | Oct. 4, 1955 |
| 2,733,534 | Mallory | Feb. 7, 1956 |
| 2,756,533 | Keith | July 31, 1956 |